June 16, 1964     A. E. BADGER ETAL     3,137,556
APPARATUS FOR PRODUCING GLASS IN SHEET FORM
Filed April 10, 1958     3 Sheets-Sheet 1

INVENTORS
Alfred E. Badger,
Norman K. Gladieux
BY and Roger P. King
Nobbe & Swope
ATTORNEYS June 16, 1964   A. E. BADGER ETAL   3,137,556
APPARATUS FOR PRODUCING GLASS IN SHEET FORM
Filed April 10, 1958   3 Sheets-Sheet 2

INVENTORS
Alfred E. Badger,
Norman K. Gladieux
and Roger P. King
BY
Hobbe & Swope
ATTORNEYS June 16, 1964 A. E. BADGER ETAL 3,137,556
APPARATUS FOR PRODUCING GLASS IN SHEET FORM
Filed April 10, 1958 3 Sheets-Sheet 3

INVENTORS
Alfred E. Badger,
BY Norman K. Gladieux
and Roger P. King.
Nobbe & Swope
ATTORNEYS

United States Patent Office 3,137,556
Patented June 16, 1964

3,137,556
APPARATUS FOR PRODUCING GLASS IN
SHEET FORM
Alfred E. Badger, Maumee, and Norman K. Gladieux and
Roger P. King, Toledo, Ohio, assignors to Libbey-
Owens-Ford Glass Company, Toledo, Ohio, a corporation of Ohio
Filed Apr. 10, 1958, Ser. No. 727,698
5 Claims. (Cl. 65—182)

The present invention relates broadly to the production of glass and more particularly to improved techniques and apparatus for producing such glass with an improved surface finish.

The term "window" or "sheet" glass as used herein is intended to mean flat, drawn glass having fire polished surfaces attained during the sheet formation as distinguished from "plate glass" which has mechanically ground and polished surfaces.

As is well known, commercial sheets of window glass are produced by drawing a sheet or ribbon from a mass of molten glass and over a bending roll. However, one of the disadvantages of drawing "sheet glass" over this bending roll has been the irregular finish of the roll surface which produces a surface sheen on the resultant sheet. The same disadvantage has been found to be present when passing a "plate glass" ribbon between opposed forming rollers, that is a surface sheen appears on both surfaces of the ribbon.

It is believed that the sheen on the glass surface is caused by reason of the fact that the glass comes into intimate physical contact with the material forming the face of the rollers themselves while the glass is in a semiplastic or pliable state, i.e., above approximately 1050° F. In present practice, the glass temperature is about 1350° F. as the glass passes over the bending roll in the manufacture of sheet glass and about 2200° F. in the manufacture of plate glass.

It has been found when a portion of the roller member is replaced by a porous metal that air, in the surface pores of the metal, will expand as acted upon by heat radiated by the relatively hot glass ribbon drawn about the roll and will form a thin film or cushion interposed between the glass and the surface of the roll.

Therefore, it is the primary object of this invention to improve the surface finish of a ribbon of molten glass drawn from a mass of molten glass.

It is another object of this invention to eliminate, or substantially reduce, the surface sheen of a glass ribbon on that portion of the ribbon normally contacting the surface of a bending roll or forming roll.

It is yet still another object of this invention to provide a cushion of an aeroform fluid between a surface of a ribbon of glass and the forming or bending roll located adjacent the path of the ribbon.

It is a further object of this invention to eliminate all intimate physical contact between the glass ribbon and the forming or bending rolls while the glass is in a semiplastic or pliable state.

Other objects and advantages of the invention will become more apparent during the course of the following description when taken in connection with the accompanying drawings.

In the drawings, wherein like numerals are employed to designate like parts throughout the same:

Figure 1:
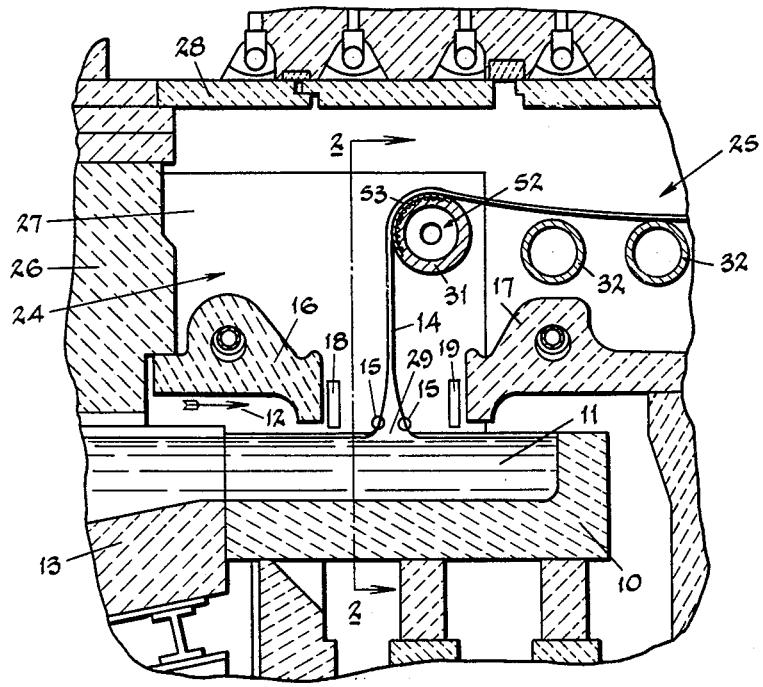
FIG. 1 is a longitudinal vertical section of a sheet glass furnace and particularly of the draw pot end thereof having the bending roll.

Referring now more particularly to the drawings and with specific reference to FIG. 1, there is shown a relatively shallow working receptacle or draw pot 10 containing a mass of molten glass 11 moving substantially in the direction of arrow 12 from the cooling or conditioning chamber 13. A sheet or ribbon of glass 14 is continuously drawn up from the mass 11, the sheet being held to width, by width-maintaining knurls or similar edge engaging rollers 15 that are positioned between the liptiles 16, 17 and sheet coolers 18, 19.

The forming chamber 24 and its adjoining flattening chamber 25 are normally defined and particularly enclosed by an end wall 26, which also serves as an end wall of the cooling chamber (not shown) and by oppositely disposed side walls 27 and roof 28.

The glass sheet or ribbon 14 drawn up from the meniscus 29 is carried along a vertical path up and over the hollow cylinder or bending roller 31. The ribbon 14 then changes its direction so as to move laterally through the chamber 25 resting on the series of horizontally aligned machine and lehr rolls 32. Since this invention relates only to the action of the glass at the point at which it is moving over the cylinder or bending roll 31, only that portion of the glass furnace which is believed to be essential to a proper understanding of the invention has been hereinabove described.

It has been found that if a film or cushion of air could be placed between the glass ribbon 14 and the bending roll 31 so that the air film would act as a lubricant or cushion to prevent actual physical contact between the glass and the roller 31, the sheen on the roll surface of the glass would be greatly improved.

Accordingly, the use of a porous surface cylinder or roll 31 is contemplated, in which air is forced through the pores so that when this air is contacted by the molten glass carried about the periphery of the roller, hot gases are formed which expand to form a thin cushion between the glass and the surface of the roll. This cushion of an aeroform fluid serves to float the glass ribbon out of physical contact from the surface of roll 31 and it has been found that this cushion will maintain the ribbon approximately .001 of an inch, or less, spaced away from the surface of the roll 31. Therefore no portion of the periphery of roll 31 will come into intimate contact with the glass ribbon.

The aeroform fluid, that forms this cushion or floatation pillow for the ribbon, is normally compressed air introduced at substantially room temperature into the hollow interior of the roll and which passes through the porous surface thereof. However other aeroform fluids such as water, gas or steam, introduced at above room temperature, could be employed and are fully intended to be within the scope of the invention.

Now will be described various types of porous surface bending rolls which may be used in order to provide this lubricating cushion to separate the molten glass from contact with the surface of a bending roll in a glass furnace.

Figure 2:
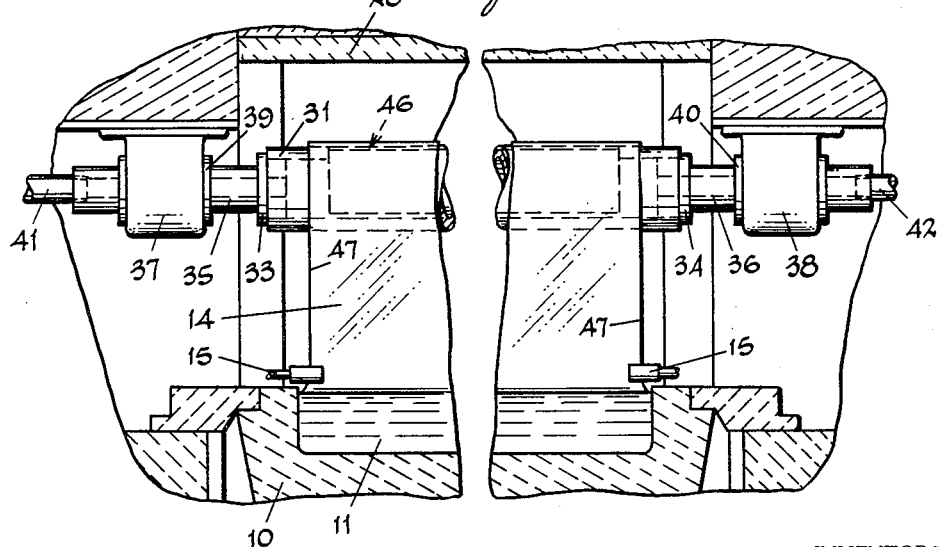
FIG. 2 is a sectional view taken along the lines 2—2 of FIG. 1.

Referring to FIG. 2, the roll 31 is mounted at each end by plugs 33, 34. These plugs in turn receive hollow support shafts 35, 36 respectively, which are themselves in turn supported from the roof 28 of the forming chamber by the means of conventional supporting journals 37, 38. Suitable insulation bearings 39, 40 are provided to insulate the hollow pipes 35, 36 from the journals 37, 38.

The bending roll 31 during normal operation is stationary, however, as seen in FIG. 2, if for any reason it should be desired to rotate the roll 31, through the medium of the hereinbefore described shafts 35, 36 that are mounted by bearings 39, 40 in the journals 37, 38 rotation of the shafts 35, 36 may be achieved through any suitable drive means. If positive drive is not desirable, the shafts are likewise freely rotatable in the journals. Suitable anchoring or locking means for the shafts 35, 36 (not shown) are additionally provided so that the roll may be fixedly positioned after it has been adjusted to achieve the desired air cushion or pillow.

At opposite ends of the pipes 35, 36 are air leads 41, 42 which are connected to a controlled source of air that is cool, relative to the temperature of the molten glass. This air, fed through both the pipes 41, 42 under the desired pressure into the hollow bending roller 31, is therefore directed, under pressure, through the porous surface of the roll 31, to contact the mass of molten glass or ribbon 14 being drawn about the roller 31. At this time, the air mass is suddenly heated by contact with the hot glass and by expansion and pressure forms a film or cushion between the glass ribbon 14 and the outer surface of roll 31. The glass ribbon is thereby suspended or floated out of contact from the surface of roll 31 by this cushioning film or pillow.

Figure 3:
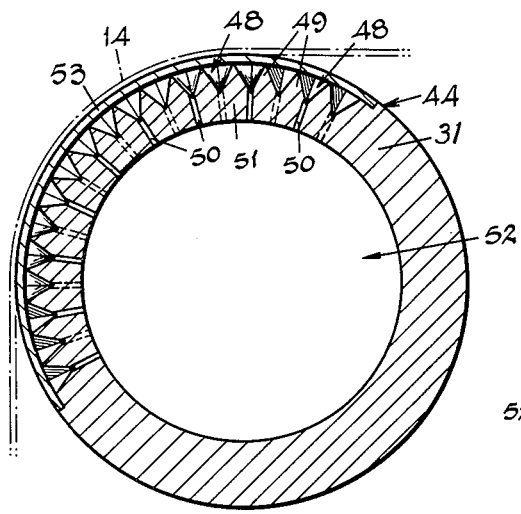
FIG. 3 is a sectional view of roll 31 of FIG. 1.

In FIG. 3, there is shown in cross-section the hollow cylindrical mandrel or roll 31 wherein the outer peripheral surface 44 has been cut out or milled to a first step 45 to form a substantially rectangular elongated cutout or opening 46. This cutout portion 46 as seen in FIG. 2 is generally indicated by the dotted outline shown and is limited in its length by a predetermined arc about the periphery 44 of the roll. In practice, an arc of 105° has been found to be suitable and the cutout is generally limited in width to slightly less than the distance between the edges 47 of the molten glass ribbon carried over the bending roll 31.

Figure 4:
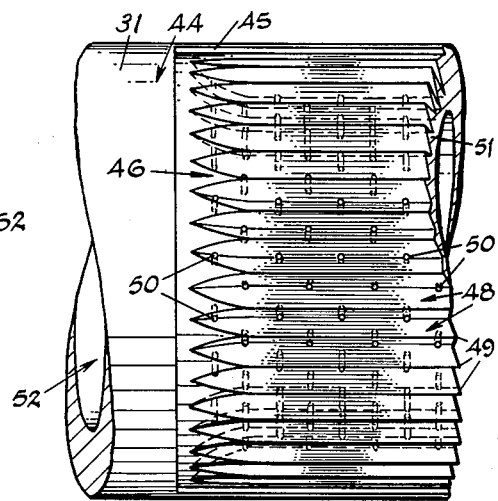
FIG. 4 is a side elevation partly in section and with parts broken away of the bending roll shown in FIG. 3.

By the use of a standard 60° milling cutter a series of V-shaped depressions are made into the surface of the roll 31 exposed by initial cutout 46, to form a series of valleys 48 interspaced between parallel ridges 49. These valleys 48 and ridges 49 in the preferred embodiment, shown in FIGS. 3 and 4, are parallel to the axis of rotation of the roll and transverse of the directional flow of the glass ribbon. However, if desired, these valleys or ridges could be formed so as to run substantially perpendicularly or diagonally, with respect to the axis of rotation, and either longitudinally or diagonally respectively with respect to the direction of flow of the glass ribbon. These valleys 48 are similar to the open spaces of the modifications of the FIGS. 5 and 6 which will be later described and the purposes of each will become apparent as the specification proceeds.

By means of a drill or other boring tool, a series of perforations or channels 50 defined by side walls 50a are made through the cylindrical wall 51 of the roll 31 in the cutout 46 as the lowest point of each valley 48. As seen in FIG. 4 each depression or valley 48 has a series of these openings or channels 50 arranged so that the openings 50 in every second valley 48 are located substantially identically with respect to each other, while the openings 50 in the valleys 48 therebetween occupy an offset or staggered position. In this way the openings form a pattern substantially representing a checkerboard wherein all of the squares of one color would appear as openings in a respective valley.

Therefore, as the air or other aeroform fluid is directed through pipes 41, 42 into the hollow interior 52 of the roll 31 as seen in FIG. 3, it would pass through the openings 50 and through valleys 48 towards the stream of molten glass 14.

In the cutout 46 and covering the ridges 49 and valleys 48, is a layer or inlay 53 of porous material that rests on the step 45. The material reforms the symmetrical outside periphery of roll 31 replacing that portion of the roll surface that has been cut-out in the desired arc. This layer of porous material approximately ⅛" in thickness, in the embodiment shown, is stainless steel and is fusion welded to the roll 31.

The use of stainless steel is intended to be illustrative only of one metallic substance which has been found to be particularly well adapted to form the porous covering, however, other metals might be substituted for the stainless steel without departing from the spirit of the present invention.

It has additionally been found that the peaks of the ridges 49 provide additional support for the porous metal inlay 53 in that they form a series of cross braces upon which the metal will rest. Therefore ridges 49 assist in maintaining the contour of the surface of the inserted porous metal in alignment with the surface contour of the roll itself so that an even contour along the complete periphery of the roll is assured.

In addition, by terminating the perforations 50 short of the porous inlay, that is at the low point of valleys while the metal rests on the peaks of the ridges between the valleys, the open valleys will slightly disperse air passing through the perforations 50. By such a construction it has been possible to eliminate the furrows which have been found to appear upon the surface of the ribbon when the perforations carried the air stream in such a manner that the air directly impinged upon a surface of the porous metal. It is believed that when the perforations 50 so terminated (i.e., so as to directly pass the stream of air to a porous metal surface located between the perforations and the glass ribbon) the air stream was unnecessarily concentrated and resulted in the hereinbefore mentioned ripples in the surface of the ribbon. This defect, i.e., furrows, was likewise found to be present when a highly perforated roll rather than a porous metal roll, was used to direct air into the glass ribbon. These valleys 48 therefore, serve to disperse the air uniformly so that it will pass equally through the porous inlay along the entire surface of the metal and thereby eliminate the furrows and ripples in the glass which have heretofore been present when the undispersed streams of air impinged on the molten glass ribbon surface directly and without either being dispersed by the channeling of valleys 48 or diffused by the porous metal inlay 53, or both. The air or other compressed gas directed through opening 50 from hollow interior 52 therefore, will pass through an enlarged recess before contacting the glass and is controlled so that as it contacts the hot molten glass it will expand to form a cushion that floats or suspends the ribbon 14 above the surface of the roll formed by the metal 53. The roll surface of a glass ribbon drawn about the porous metal bending roll is thereby substantially improved over the conventional metallic roll which comes into physical contact with the molten glass.

Figure 5:
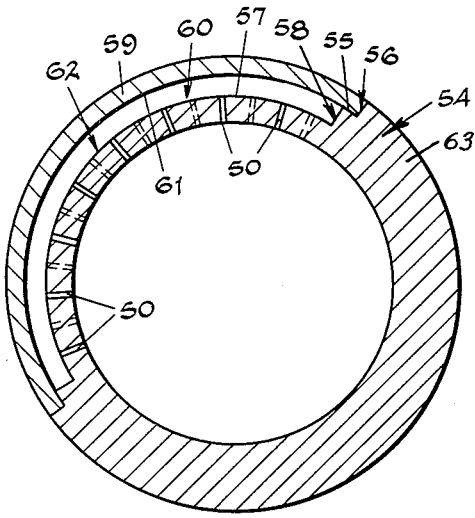
FIG. 5 is a sectional view of a modification of the bending roll as shown in FIG. 3.
Figure 6:
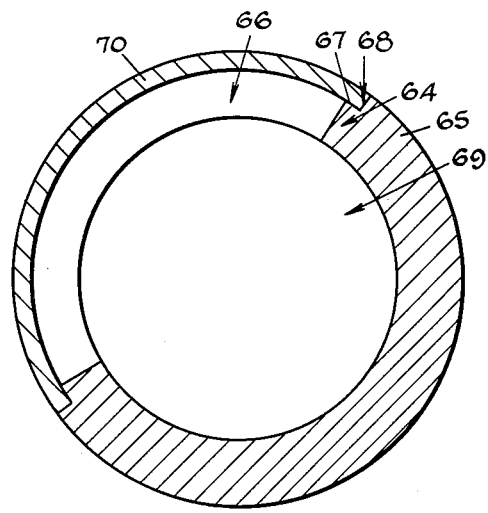
FIG. 6 is a sectional view of still another modification of the bending roll as illustrated in FIG. 3.

Referring now to FIGS. 5 and 6, there are shown two modifications of the hereinabove described porous metal cylinder or bending roll. In FIG. 5 a hollow cylinder or roller 54 is milled with a first step 55 through a 105° arc to form a cutout 56, similar to cutout 45 hereinbefore described. However, instead of milling ridges and valleys, a second step 57 similar to the first step but of slightly reduced dimensions is cut to form the second cutout 58. An inlay of porous metal 59 is fitted into first step 55 to occupy cutout 56 and forms a hollow space 60 between its lower edge 61 and the surface 62 of roll 54 exposed by the second step 57. This hollow space 60 functions to disperse or spread the air passing through openings 50 in a manner similar to the dispersing gained by valleys 48 hereinbefore described.

A series of openings 50 are made through the wall 63 of roll 54 in the vicinity of the cutout 58 in the same checkerboard pattern as hereinbefore described. The relatively cool air or other aeroform fluid then passes thorugh the hollow space 60 and porous metal layer 59 to expand as it contacts the hot molten glass drawn about roller 54. This expanding gas floats the glass ribbon as hereinbefore described.

In the modification shown in FIG. 6, instead of a second step 57 as seen in FIG. 5, the entire wall 64 of the hollow cylinder or roller 65 has been milled or cut away to form an opening 66, which is slightly reduced in dimensions from the cutout 67 originally formed by first step 68. This opening 66 is in open and free communication with hollow interior 69. Opening 66 being in open communication with the interior surface of the porous metal 70 and the hollow interior 69 of roller 65 allows the air forced into the hollow interior to contact the porous metal evenly across its entire area.

Positioned in cutout 67 and resting on that portion of step 68, which remains after the opening 66 is formed, is an inlay of porous metal 70. Air directed into the hollow interior 69 of roll 65 now passes through opening 66 and porous metal inlay 70 to expand on contacting the molten glass, drawn about roll 65, as hereinbefore described.

Figure 7:
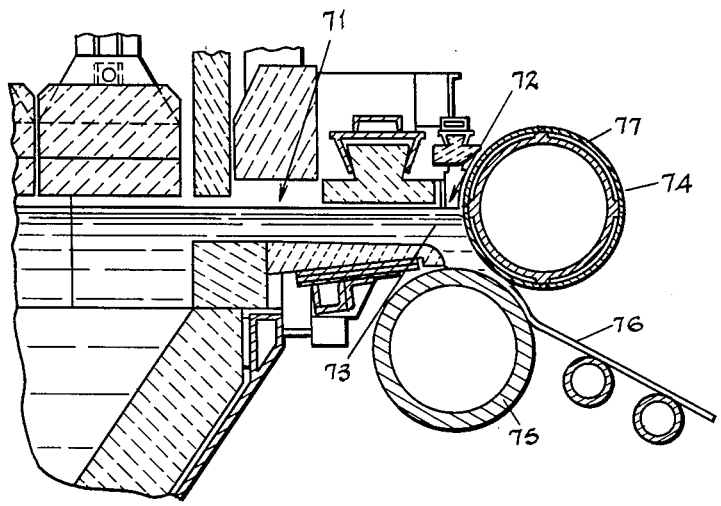
FIG. 7 is a longitudinal vertical section of a plate glass furnace and particularly of the working end thereof having the forming rolls.

Referring now to FIG. 7, there is shown the working end of a glass plate furnace. The forehearth portion 71 is provided at its outlet with a spout 72 through which the molten glass 73 flows. This molten glass 73 flows then between counter-rotating forming rollers 74, 75 that are driven and mounted in the conventional manner. The molten glass 73 on emerging from the rollers is a continuous ribbon 76 that is conventionally passed along for further processing.

As was the case with the hereinbefore discussed window glass, it is desirable to eliminate the surface sheen from at least one surface of the plate glass ribbon 76. In order to accomplish this, the upper roller 74 has a porous metal covering as indicated at 77 about its periphery. Air, introduced into the hollow interior of the roller passes through this porous metal to prevent physical engagement of at least the upper forming roller 74 from the ribbon 76 passing therebeneath.

The reduction or prevention of surface sheen is highly desirable in the manufacture of plate glass in that by providing a relatively smooth ribbon surface the amount of grinding and polishing necessary subsequent to forming may be substantially reduced if not entirely eliminated.

It naturally follows if desired, that both upper roller 74 and lower roller 75 could have a porous metal surface directed towards the ribbon so as to modify the action of each roll in developing an irregular surface finish or surface sheen on both surfaces. Likewise, in view of the extremely high temperatures it is conventional to provide auxiliary cooling means to cool both the bending and forming rollers. This cooling might possibly be supplied by water cooled pipes in the interior of the roll or suitable air cooling might be effective.

Figure 8:
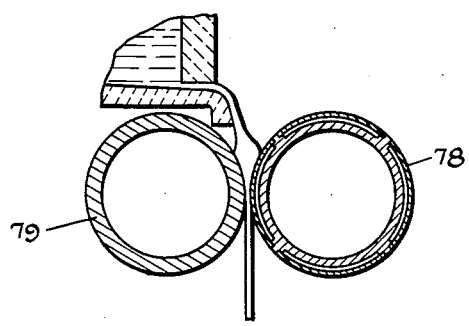
FIG. 8 is a longitudinal vertical section of a portion of FIG. 7 showing horizontally aligned forming rolls.

It is additionally pointed out that the forming rolls could be disposed so that their axis of rotation are substantially horizontally aligned as shown by rolls 78 and 79 of FIG. 8. One or both of these rolls can have a porous metal surface so that as the ribbon 80 is downwardly drawn, one or both surfaces of the ribbon would have a relatively smooth surface.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:

1. An apparatus for controlling the surface finish of hot glass in sheet form passing thereby including at least one hollow cylinder, at least a portion of the peripheral surface of said cylinder comprising a porous inlay, said porous inlay having a width transverse of the glass less than the width of the glass sheet passing thereover, means mounting said porous inlay to said cylinder so that the outer surface of said porous inlay forms an extension of the periphery of the cylinder, means for passing a continuous stream of a relatively cool aeroform fluid into the interior of the cylinder and through the porous inlay to form a thin gaseous film between the exterior surface of said inlay and the glass sheet, and air dispersing means disposed beneath and spaced from said porous inlay to diffuse the stream of aeroform fluid to insure that aeroform fluid contacts the porous inlay evenly across its undersurface.

2. An apparatus as defined in claim 1, wherein the peripheral length of the porous inlay as measured parallel to the direction of the glass flow is at least substantially equal to an arc of 105°.

3. An apparatus as defined in claim 1, wherein said cylinder includes a first step, said porous inlay being seated in said first step and a second step, said second step formed within the borders of said first step and defining a hollow space between the undersurface of the porous portion and the portion of said cylinder exposed by said second step.

4. An apparatus as defined in claim 3, wherein said air dispersing means further comprises means defining a plurality of channels extending from the hollow cylinder interior, through the cylinder portion within the borders of the second step, to the hollow space below the porous inlay.

5. An apparatus as defined in claim 4, wherein said channels form a checkerboard pattern of openings on said cylinder portion exposed by said second step.

References Cited in the file of this patent

UNITED STATES PATENTS

| | | |
|---|---|---|
| 679,705 | Sievert et al. | July 30, 1901 |
| 1,399,547 | Ewing | Dec. 6, 1921 |
| 1,554,267 | Ewing | Sept. 22, 1925 |
| 1,591,179 | Myers | July 6, 1926 |
| 1,622,817 | Waldron | Mar. 29, 1927 |
| 2,505,103 | Devol | Apr. 25, 1950 |
| 2,826,005 | Wynne | Mar. 11, 1958 |